United States Patent [19]
Wycoff

[11] 3,971,971
[45] July 27, 1976

[54] ELECTRIC HOIST CONTROL AND BRAKING SYSTEM

[75] Inventor: David C. Wycoff, Roanoke, Va.

[73] Assignee: Ingersoll-Rand Company, Woodcliff Lake, N.J.

[22] Filed: Nov. 15, 1974

[21] Appl. No.: 524,081

[52] U.S. Cl. .............................. 318/203 A; 318/211
[51] Int. Cl.² .......................................... H02P 1/40
[58] Field of Search ..... 318/203 A, 203 R, 209–212

[56] References Cited
UNITED STATES PATENTS

| | | | |
|---|---|---|---|
| 1,754,779 | 4/1930 | Thurston | 318/211 X |
| 2,213,892 | 9/1940 | West | 318/203 R |
| 2,246,289 | 6/1941 | Brockhaus | 318/203 R |
| 2,420,192 | 5/1947 | Rathbun | 318/203 R |

Primary Examiner—Gene Z. Rubinson
Attorney, Agent, or Firm—Walter C. Vliet

[57] ABSTRACT

The invention relates to control and braking systems for apparatus driven by single and polyphase alternating current induction motors. The system prevents destructive and dangerous overspeeding where the nature of the driven load is such that it can furnish sufficient torque to overdrive the apparatus in any one of several potential failure modes. A capacitor selected according to this invention is permanently connected across the motor winding such as to cause the drive motor to automatically develop retarding torque in the absence of power supplied thereto sufficient to restrict the overdrive speed to a value not appreciably exceeding the normal operating speed. The system also incorporates drive motors specifically designed with a predetermined value of starting torque appreciably less than that conventionally applied to similar apparatus for the specific purpose of limiting the load handling capability of the apparatus, thus preventing dangerous overloading. Numerous related benefits are attained through the aforementioned features, including improved controllability, improved holding brake life, and more reliable arresting of motion at limits of safe travel.

9 Claims, 5 Drawing Figures

ELECTRIC HOIST CONTROL AND BRAKING SYSTEM

BACKGROUND OF THE INVENTION

This invention relates primarily to overhead electric hoists, but is equally advantageous for other types of apparatus where similar conditions exist. It is specifically concerned with apparatus driven by single phase, or polyphase alternating current induction motors.

Hoists driven by single phase motors are generally of the capacitor start induction run variety wherein the motor stator has two windings; one generally designated as the running winding, and the other the starting winding. A capacitor is connected in series with the starting winding as is a centrifugal switch. At standstill when power is applied, the switch contact is closed and both windings are energized whereupon the motor develops torque and the rotor of the motor accelerates. When it reaches approximately three quarters of its normal running speed, the centrifugal switch contact opens removing power from the starting winding and its series capacitor. The motor now has sufficient torque to continue accelerating to its normal running speed. It is characteristic of single phase motors of this type that they cannot be reversed while running, which is considered a necessary condition in hoist apparatus. In order to provide reverse while running capability, it has been general practice to provide a specially designed centrifugal switch, which, when the centrifugal mechanism actuates, a frictional connection is made between the switch contact mechanism and the rotor of the motor such that it reacts to the direction of motor rotation by opening one contact to de-energize the starting winding and at the same time closing a second contact through which the same winding can be re-energized with reverse polarity. When reverse polarity is thus applied, the motor develops torque in the opposite direction to its rotation, stops and accelerates in the reverse direction, whereupon the action of the centrifugal switch described above repeats itself.

The centrifugal switch, while adequate for the purpose of making the single phase capacitor start induction run motor reversible while running has several disadvantages. It is relatively costly to build and install and being mechanical in nature and frictionally engaged it is subject to wear and failure. The electrical contact for various reasons, such as erosion and contamination, can fail to perform either to close or open the circuit intended. Critical location and mounting requirements make maintenance of the switches difficult.

Since the start winding and its series capacitor are energized only during the very short time during which the motor is accelerating, it is general practice to use a relatively small and inexpensive electrolytic capacitor in series with the starting winding of the motor. These capacitors are subject to failure due to overheating if the motor is subjected to too many starts and/or reversals and are generally less reliable than other types.

Further, capacitor start motors as applied to hoists have had the characteristic of developing high starting torques, typically three times rated torque. Heretofore, high starting torque has been considered a desirable feature of hoist motors. High starting torques were necessary with many hoist designs using mechanical load brakes since these load brakes have a tendency to lock up under certain conditions of operation and require considerable excess motor torque to break them free. The high torque also gave fast acceleration such that a typical hoist with a capacity load reached full running speed in approximately 1/10 second. The use of high torque motors on hoists have a number of disadvantages. The hoist thus equipped is capable of lifting loads far in excess of the full rated capacity of the hoist. Hoisting loads above rated capacity is generally considered a very serious safety hazard. In recognition of this, it is becoming common practice to provide overload switches on such hoists to cut off power to the hoist when it is overloaded.

Further, the high starting torque makes control of the hoist more difficult. The rapid acceleration of the motor, especially in the lowering direction, makes it difficult to achieve small increments of motion necessary to place a load in a precise location. Further, the current drawn on starting by the typical single phase hoist motor is very high, being on the order of five times its normal full load running current. The large starting current often causes voltage drops on the supply line which may cause problems with other equipment on the same supply. Additionally, high starting torque of the drive motor tends to apply higher stresses to other parts of the apparatus and increase the wear thereof.

The use of polyphase alternating current induction motors eliminates a number of the above difficulties with switching capacitors and hence have found wide use for hoist motors. However, a number of problems still remain and are common with single phase hoist motors.

Electric hoists are generally used for handling heavy loads overhead, their safe usage is largely dependent on the effeciency and reliability of their braking systems. Early hoists using alternating current motors were generally equipped with two independent brakes, one of which was known as a mechanical load brake and the other a spring set electrically released friction brake generally referred to as a holding or motor brake. Each of these brake types were designed to stop and hold any load within the capacity of the hoist. Thus, the failure of one would not result in a free falling load.

The mechanical load brake is a device wherein friction surfaces are brought into engagement by means of torque derived from the suspended workload in a manner to retard and stop the descent of said workload. The frictional surfaces tend to be released from engagement by torque from the motor in the lowering direction. The design is made so that with the holding brake released and the motor driving downward, the load brake generates a frictional force to maintain the speed of the descending load at something under the no load speed of the motor. However, if the motor torque is then removed such as through a power supply failure, the brake would stop and hold the load. The load brake is disengaged during hoisting by a clutching mechanism.

While effective from a safety standpoint, the load brake has many disadvantages. It is expensive to build, difficult to maintain, and increases the physical size of the hoist. Many designs have a tendency to set up undesirable vibration and chatter. Further, since the load brake is required to absorb and dissipate as heat the energy of the descending load, a large amount of heat is developed, severely limiting the amount of work which the hoist can perform.

The electric holding brake incorporates an electromagnet which, when energized, releases the frictional surfaces otherwise held in contact by means of springs. The coil of the electromagnet is generally connected to one phase of the motor power supply such that when the motor is energized, the brake is released and sets or re-engages when the motor is de-energized.

More recently, several types of hoists have omitted the mechanical load brake and relied on regenerative braking of the induction motor as the second braking means. The phenomena of regenerative braking is a well-known characteristic of induction motors. When the motor is driven above its synchronous speed, it develops braking torque, acts as a generator returning power to the supply. Since the increase in speed required to convert from motor to generator action is not great and motor losses are not significantly different, it can be seen that this approach has significant advantages over the use of a mechanical load brake. However, from a safety standpoint, there is the disadvantage that there is no protection against a simultaneous holding brake and power failure. Should the holding brake fail during operation of the hoist, a free falling load would result when the operator attempted to stop the hoist. An alert operator, however, could keep the load under control by re-energizing the hoist in either the raising or lowering direction. If the power should fail at the same time, there would be no way to prevent the free falling load.

Another disadvantage of eliminating the load brake in prior art hoists has been that in the absence thereof, the holding brake is required to absorb all of the kinetic energy of the hoist and its load each time the hoist is stopped. Since it is a frictional device, it is subject to overheating and wear, thus requiring periodic maintenance and repair.

It has long been recognized that a dual braking system where each brake was effective in the event of power failure was a highly desirable feature. The expensive variable speed hoists used on large overhead cranes and elsewhere, where the inefficiency and other problems of mechanical load brakes could not be tolerated, have used expensive and complicated means to provide this feature, which has been referred to as Off Position Dynamic Braking. On cranes and hoists powered from a direct current source, it is quite simple to connect the direct current drive motor such that it becomes a self-excited generator and thus provides the second source of braking in the absence of external power. On alternating current powered cranes and hoists, the feature could be attained only through the addition of auxiliary equipment. This commonly took the form of an eddy current brake with an auxiliary generator attached to the same shaft to furnish excitation current to the eddy current brake and thus make it independent of an external source of power.

While dynamic braking in any form since it depends on rotation to develop torque, will not hold a suspended load stationary, it does provide controlled lowering at a speed often below the normal lowering speed, and therefore is a relatively safe condition, especially compared to a free falling load.

Still another problem exists with present hoist control systems. It is desirable to minimize the overall heights of the hoist with its load hook in its fully raised position since generally available vertical dimension in workplaces is limited. The vertical height of the hoist, or "headroom" as it is commonly referred to, subtracts from the clearance for moving the material to be handled below the hoist. This means that the hook or lifting device must be capable of being raised as close to the winding means as possible. However, if the lifting means is allowed to contact the winding means or other parts of the hoist while still moving upward, damage to the hoist, even to the extent of causing the load to fall, can result. To prevent this, it is common practice to provide travel limit switches to limit the upward travel of the load hook. These usually take the form of a switch arrangement which first de-energizes the drive motor and sets the holding brake and secondly, if the upward travel continues, as would be the case if the motor brake failed, a second switch actuates to release the brake and re-energizes the motor in the reverse or lowering direction. This is commonly referred to as a plugging type limit switch. Normally, the plugging limit switch stops and reverse the hook motion quite rapidly. There are problems with the system, however. First, there is a time delay between actuation of the switch and actual application of reverse power during which upward travel can continue. Secondly, unless an operator is alert or additional circuitry is added, once the motor is reversed and started downward, the hook will clear the limit switch actuator whereupon, unless the raise control button has been released, the hoist will again start to raise going through alternate raise and lower cycles in a sometimes violent manner until the raise control button is released. Further, it is possible for the motor to fail to respond to the application of reverse power in the manner intended. If, during the raising operation, one phase of the power supply became open circulated, in the case of polyphase motors, the motor would continue to drive the load upward running as a single phase motor. After tripping the plugging limit switch and having power from the single phase reapplied, the motor would not reverse but continue to drive in the upward direction with potentially hazardous results.

The benefits of this invention can be utilized to eliminate the plugging feature from the limit switch, thus reducing the potential hazard thereof. In this case, when the limit switch is tripped, the motor brake is applied and dynamic braking of the motor occurs resulting in faster stopping action. Even should the motor brake fail completely, the dynamic braking effect produces sufficient retarding torque to prevent damage.

It is, therefore, an object of this invention to provide an electric hoist or similar equipment with a means of dynamic braking to assist other braking means in arresting motion thereof without the necessity of auxiliary equipment for the purpose.

It is a further object of this invention to provide an emergency dynamic braking means such that in the event of simultaneous power and holding brake failure, the motor will automatically develop retarding torque sufficient to prevent overspeeding.

It is a further object of this invention to provide more effective and reliable means of arresting motion of the equipment such as at extremes of safe travel thereof.

It is a further object of this invention to provide an electric hoist or similar equipment utilizing single phase drive motors which can be reversed while running without requiring a mechanically actuated switch thus improving reliability thereof.

It is a further object of this invention to provide an electric hoist or similar equipment utilizing single phase drive motor wherein the motor is of the permanent split capacitor type designed to provide less starting torque than a conventional single phase hoist motor such that improved efficiency, reduced starting and running torques are achieved. The lower torque reduces the possibility of dangerously overloading the apparatus and improves control characteristics.

It is a further object of this invention to provide an electric hoist or similar equipment utilizing polyphase drive motors which reduce the tendency for rotation of the drive motor in a direction opposite to that intended when the apparatus is subject to the influence of torque from the driven load in the event the drive is started with an open phase of the power supply.

It is a further object of this invention to provide an electric hoist or similar equipment utilizing polyphase drive motors wherein the apparatus can be operated on a single phase supply at reduced capacity in an emergency or other necessary situations.

In general, the foregoing and other objects will be carried out by providing an electric hoist drive, control and braking apparatus, comprising: an electric hoist motor; a control system for starting, stopping, and controlling the direction and limit of travel of said motor; a capacitor connected to one or more of the motor windings such that upon removal of power from said hoist motor windings, said capacitor causes said hoist motor to develop braking torque upon continued rotation of said motor above a speed substantially below normal operating speed, and said capacitor and said motor windings cooperate to effect and limit starting torque and braking in operative association with the running performance of said motor and the hoist limit control.

The aforementioned and further objects and features of this invention will become more apparent by reference to the following description taken in conjunction with the accompanying figures, wherein two embodiments of this invention are illustrated.

DESCRIPTION OF THE DRAWINGS

In FIG. 1, the essential elements are the hoist supporting means 1, hoist housing 2, drive motor 3, reduction gearing 4, load brake 5, holding brake 6, winding means 7, load supporting chain 8, load hook 9, and control handle 10.

FIG. 2 illustrates the electrical system of a typical single phase prior art hoist. Electrical power of appropriate voltage and frequency is applied to lines 13 and 13' thereby energizing the control circuit transformer 19. Actuation of the raise control switch 14 (Pushbutton) energizes the coil 15 of the raise contactor closing the power circuit 16 to the drive motor 17 and simultaneously applying voltage to the brake coil 18 to release the frictional surfaces thereof, thereby allowing the motor to drive the hook in the upward direction through rotation of the winding means 7. Control voltage is supplied by means of transformer 19 and DC voltage is obtained for the brake coil from rectifier 20. The drive motor shown is of the conventional capacitor start single phase induction motor design with a starting capacitor 25 and a centrifugal switch 26. On hoists using mechanical load brakes, the clutching mechanism renders the load brake ineffective in the raising direction. Should the raise control switch 14 be maintained closed by the operator, the hook will continue upward until the limit switch is contacted which will actuate the upper limit switch 21 and cause the normally closed contact 21' thereof to open. This removes coil voltage from the raise contactor which opens its contacts removing power from the motor and the holding brake coil.

Figure 1:
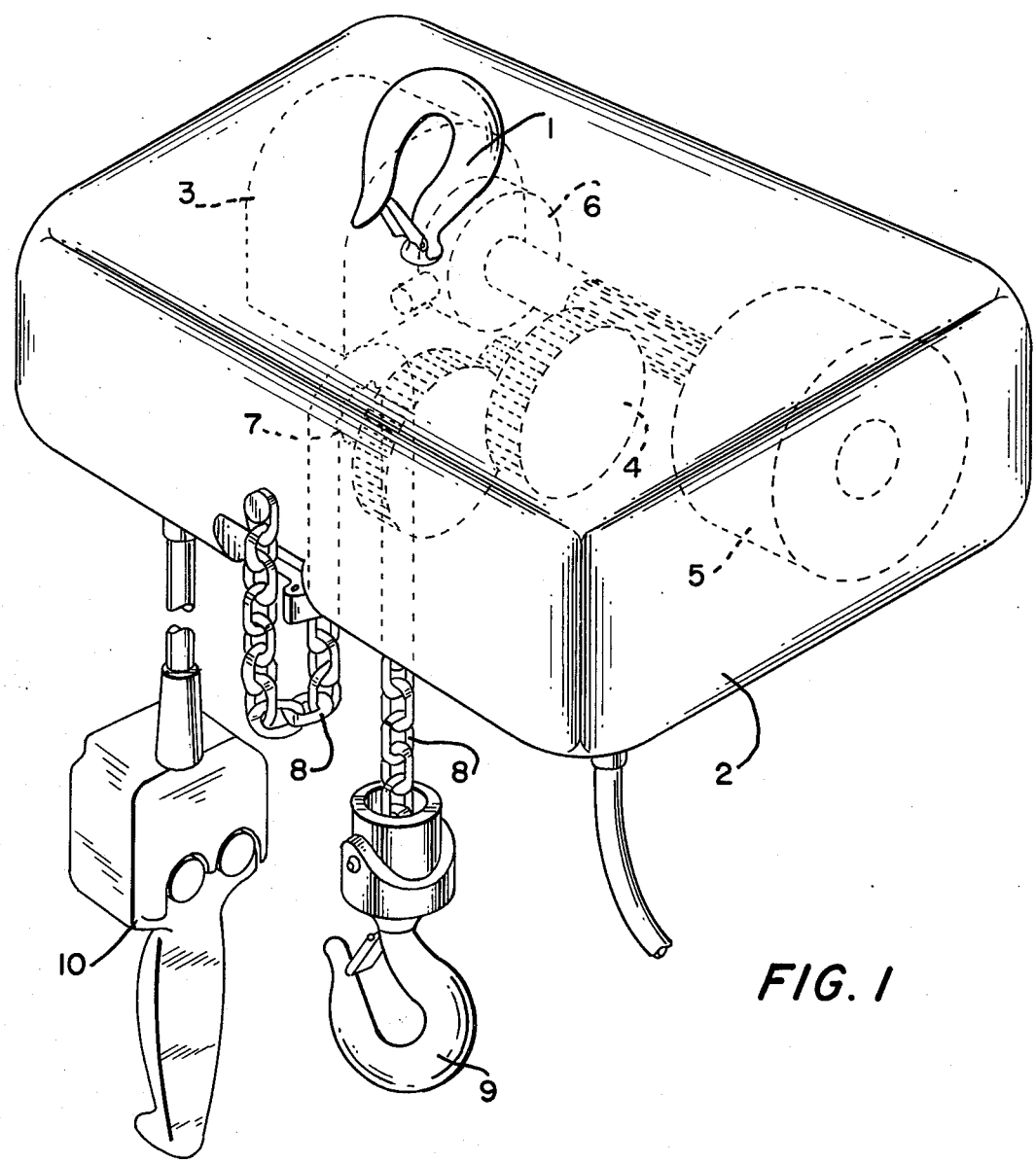
FIG. 1 is an isometric ghost of a typical electric hoist.

Thus, the frictional surfaces of the holding brake would be applied to stop the upward motion of the hook. The time required is dependent on the inertia of the rotating parts of the equipment, the load, if any, on the hook, the time delay between actuation of the limit switch and removal of power from the motor, the time required for application of braking torque as well as the amount of torque actually supplied by the brake. Upward travel will continue after the normally closed limit switch contact opens and the distance moved will vary with the weights being lifted and the condition of the brake. If, with the up control switch maintained closed, the upward travel continues far enough, the normally open contact 21'' of the limit switch automatically will energize coil 23 of the down contactor closing contacts 24 to reverse the motor 17 and at the same time re-energize the brake coil 18 causing it to release. In the normal situation, upward motion would be arrested and the hook would be driven downward. Assuming the up control switch is still maintained closed the downward movement will continue until the normally open contact of the limit switch re-opens disconnecting the motor and setting the brake. Again, motion will continue for a time. If the motion continues long enough, the normally closed limit switch contact will also reclose, whereupon upward motion will again take place. It can be seen that violent upward and downward motion of the hook can continue until the operator releases the up control switch. This undesirable and potentially hazardous situation can be corrected by increasing the travel required between the actuation of the normally open and the normally closed limit switch contacts, which, in turn, decreases the useful lifting height of the hoist or by adding additional control elements and circuitry. The circuitry of the instant invention provides for the application of the dynamic braking of the motor as well as de-accelerating torque from the holding brake to arrest motion more quickly and with greater reliability since fewer switching functions are required as well as through the independence of the two independent braking means.

To lower a suspended load with the prior art hoist, the lower control switch 22 (pushbutton) is actuated, energizing the coil of the lower contactor 23, which in turn closes the contacts 24 of the contactor applying power to the drive motor such as to cause it to drive the load in a downward direction and to simultaneously release the holding brake. With hoists incorporating a load brake, the load brake clutching means will actuate causing it to become effective. Torque from the winding means under the influences of the suspended load causes the frictional surfaces thereof to become engaged to prevent lowering. However, motor torque acts to release the frictional surfaces. The brake is so designed that under equilibrium the load is lowered at a speed approximating its normal lifting speed.

With hoists not utilizing the load brake, the action is the same as the foregoing except that the weight of the suspended load causes the motor to accelerate to a speed (synchronous) where it ceases to develop driving torque and then further increases to a still higher speed at which time it becomes a generator and produces braking torque sufficient to prevent additional acceleration. With the type of motor normally used the lowering speed is not greatly in excess of the normal hoisting speed. While functioning as a generator, the drive motor returns power to the supply lines. There are no brake frictional or abnormal motor losses to cause heating of the hoist parts thus allowing a hoist without a load brake to do more work than one with a load brake.

When the down control button is released to arrest further lowering, the down contactor opens, cutting off power to the motor and engaging the holding brake. On hoists with load brakes, the removal of motor torque and the continued torque from the suspended load on the winding means increases the torque developed by said brake which, combined with the retarding torque of the motor brake arrests motion very rapidly. On hoists without load brakes, the holding brake must absorb the rotational energy of the system and hold the load stationary. Thus, stopping is not as fast and control is not as precise as with a load brake.

The lower limit switch 28 functions identically to the upper limit switch. However, it is common practice not to incorporate the plug reversal feature in the lowering direction, since the hazards to operating personnel are reduced with the hook at its fully lowered position. However, should the brake fail to stop the hoist, damage to the hoist itself is likely to occur. Therefore, the dynamic braking feature of the instant invention would assist in preventing overtravel, and even should the holding brake fail, the motion would be slowed to a degree that damage to the hoist would be prevented.

Figure 3:
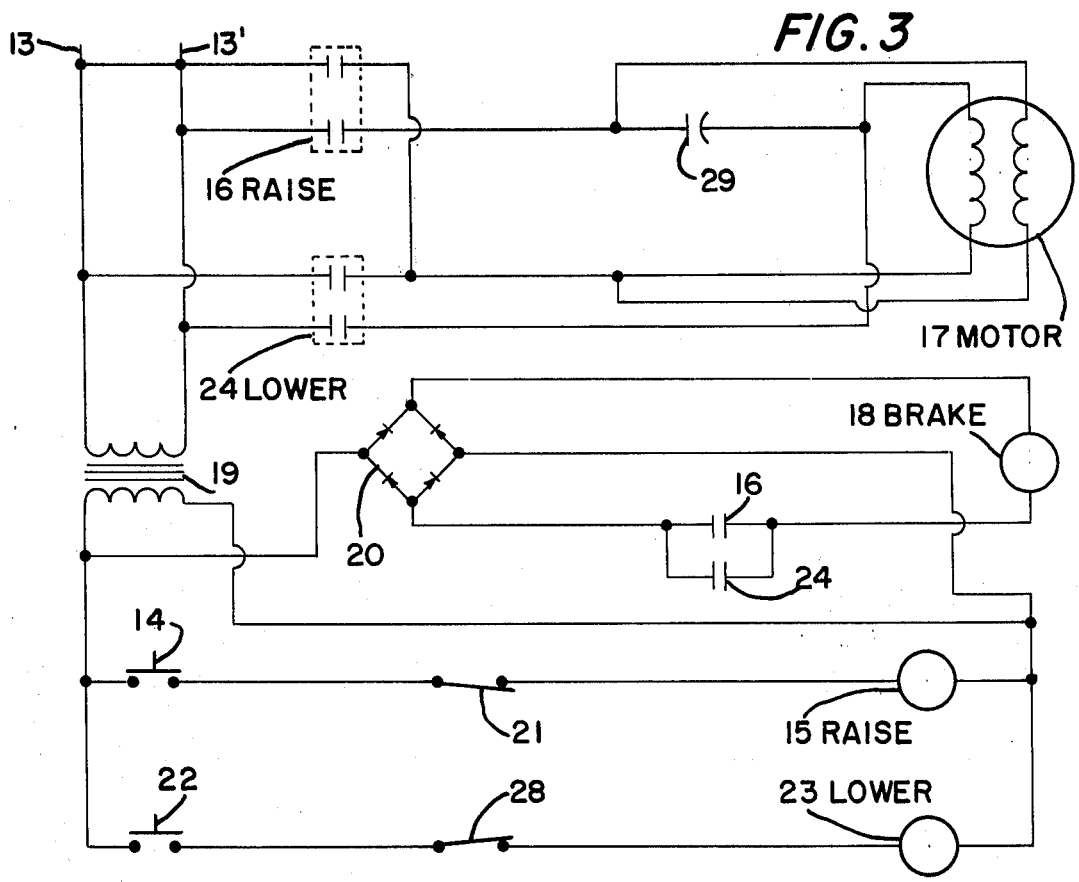
FIG. 3 is an elementary wiring diagram for a single phase electric overhead hoist according to the first embodiment of the invention.

The mechanical construction of a hoist utilizing the instant invention would be as shown in FIG. 1, except that the load brake would normally be omitted. The electrical circuit of FIG. 3 is identical, except that the single phase motor is a type commonly known as a permanent split capacitor motor and the omission of the plugging feature of the limit switch. Omission of the load brake and/or the plugging limit switch is desirable but not essential to the successful application of this invention.

In construction, the permanent split capacitor motor is similar to the capacitor start induction motor. The second winding, which was the starting winding of the capacitor start motor, is energized continuously as long as the motor is running, and in this case the capacitor 29 remains in series with the winding. Thus the winding and the capacitor are designed with greater thermal capacity. The high electrical losses and resultant heating of the electrolytic capacitors used with capacitor start motors makes them unsuited for use with permanent split capacitor motors. Therefore, the more reliable and efficient oil filled type of capacitor is used. The oil filled capacitor designed for use with the permanent split capacitor motor is physically larger and more expensive than the otherwise equivalent electrolytic capacitor. Another factor which tends to limit the general use of the permanent split capacitor motor, particularly on this type of equipment, is its inherent low starting torque. The amount of series capacitance required to produce high starting torque when left in the circuit for running conditions results in extremely inefficient operation. However, this invention teaches that a compromise is possible wherein a value of starting torque can be attained which is adequate for operation within the load capacity of the hoist, and while this value of starting torque is far less than that of prior art hoists, it does provide an effective means of preventing overloading the apparatus because of the resulting inability to lift dangerous overloads. At the same time, the value of capacitance, while not optimum for running conditions, is still of a value such that the motor is more efficient when running than the capacitor start type motor. The lower starting torque provides the additional advantages of more precise load positioning as well as lower stresses and wear on driven parts. Switching of a starting winding is not required with the attendant reduced possibility of failure. The hazards of failure to reverse on command are reduced resulting in safer operation. The use of the more reliable oil filled capacitor yields the benefits of improved motor reliability.

Figure 2:
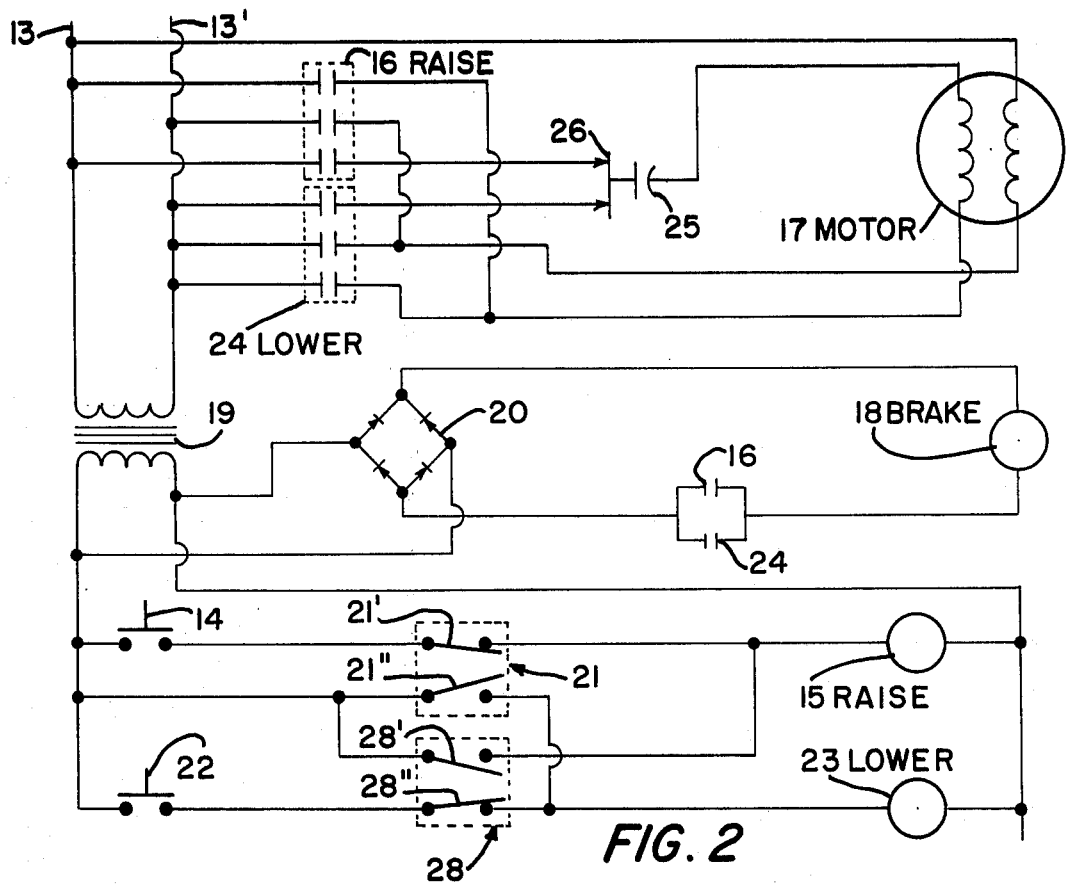
FIG. 2 is an elementary wiring diagram of a typical single phase electric overhead hoist.

As can be seen by comparison of FIG. 2 and FIG. 3, the switching required to provide reversing control of the permanent split capacitor motor is simpler in that fewer contacts are required to provide motor power. In prior art hoists with capacitor start motors, it has been general practice to leave one side of the run winding permanently connected to the power source in order to avoid additional contacts on the control switches. This can be hazardous to both personnel and the equipment in case of an accidental ground on that winding or the circuit thereto. With the simpler switching required for the permanent split capacitor motor, fewer contacts are utilized, even though all windings are disconnected from power at rest.

With the three wire permanent split capacitor motor design, the capacitor is permanently connected in series with the windings of the motor. If the motor running at or near full speed and power is removed, the motor develops retarding torque by, in effect, becoming a self-excited alternator. Due to the residual magnetism of the iron in the motor's magnetic circuit, should the motor starting from rest with its windings de-energized be driven by external forces, such as a load suspended by a hoist, to a speed near its normal running speed, the motor windings become self-excited and the retarding or braking torque is developed in sufficient magnitude to restrain the speed of a fully loaded hoist to a speed approximately equal to or less than normal lowering speed. Additionally, if the capacitance has been selected based on the impedance characteristics of the motor to yield a resonant circuit condition, even if the motor has been de-energized for a long period of time, the residual field will increase to cause sufficient braking torque to be developed to prevent overspeeding of the motor when driven by an overhauling load within the hoist rating. The resonant circuit condition referred to is a frequency dependent condition known in the art. The motor rotor turning within the fixed residual field of the stator iron induces an alternating field in the rotor. At some speed the frequency of this induced field equals the resonant frequency of the stator circuit whereupon the induced volatges and currents increase in magnitude to a point where useful restraining torque is developed by the motor. This phenomena, therefore, has the effect of equipping the hoist or other apparatus with an additional braking means without additional equipment or electrical circuitry. In addition to assisting other braking means in stopping each time, the running hoist is stopped, braking is provided which prevents overspeeding in the event of the failure of the other braking means and is independent of the elapsed time since the motor was last energized.

The automatic braking effect of the motor reduces heating wear on other braking means such as the holding brake on an overhead hoist, thus reducing maintenance or repair thereof. Because of the faster, more positive stopping control of the hoist, loads can be positioned more accurately. The application of the dynamic braking effect as a second braking means effective in the hoisting as well as lowering directions makes it possible to eliminate the conventional plugging type upper limit switch, thus eliminating the possibility that the motor would drive the hook into the winding means in the event of failure of a centrifugal switch. The stopping at both limits of travel is faster and more precise. Further, the possibility of hazardous oscillation between hoisting and lowering is eliminated at both upper and lower limits of travel.

It has been determined a permanent split capacitor motor and associated capacitor can be designed with a starting torque of between 125 and 175% rated torque and at the same time achieve the other desirable characteristics of power off braking, etc. Prior art teaches the use of motor designs providing starting torques in the order of 300% rated running torque.

Figure 4:
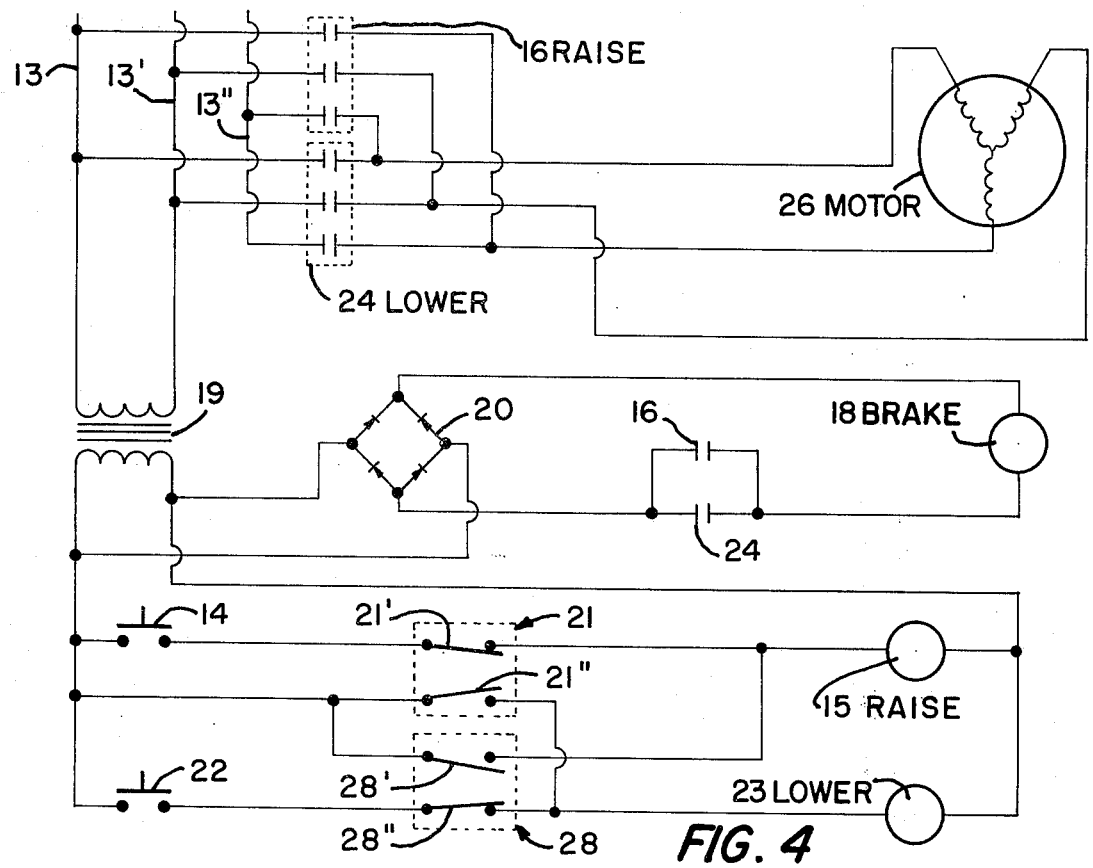
FIG. 4 is an elementary wiring diagram for a typical polyphase electric overhead hoist.

FIG. 4 illustrates the electrical system of a typical prior art polyphase hoist.

Figure 5:
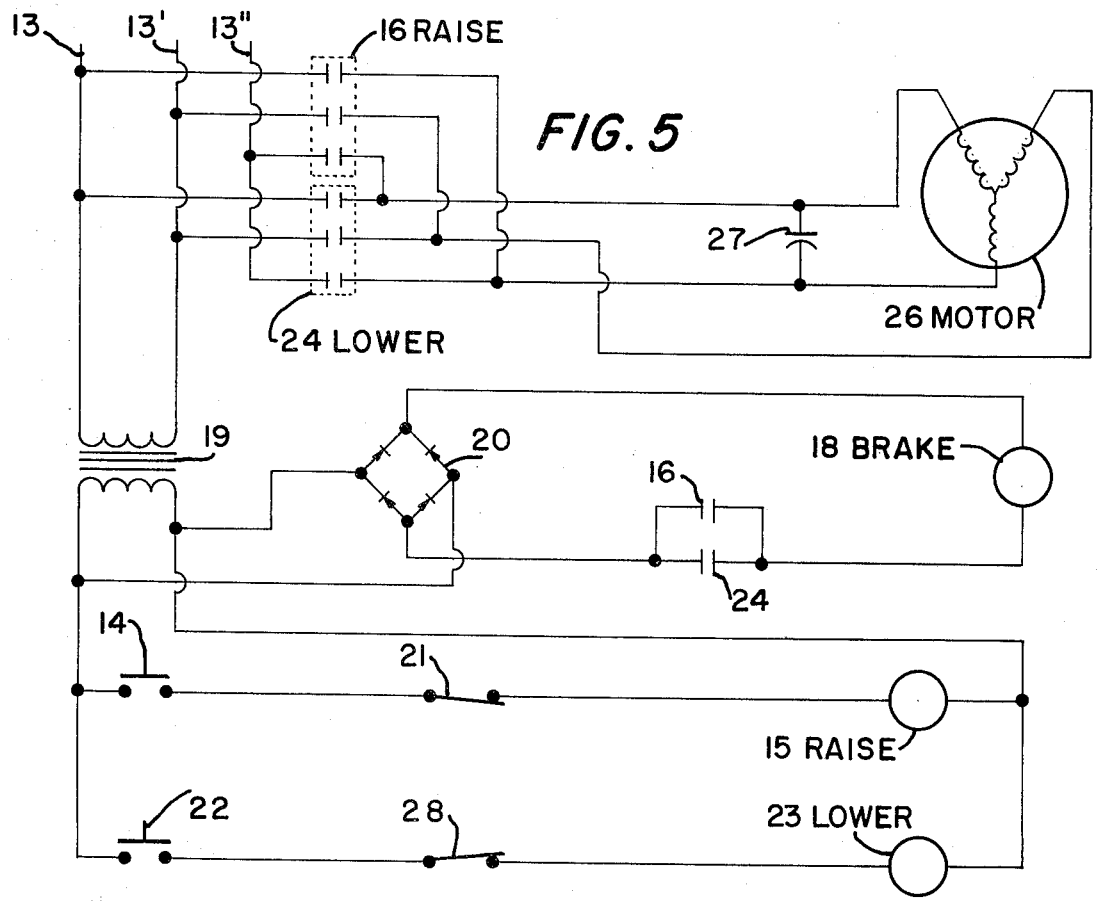
FIG. 5 is an elementary wiring diagram for a polyphase electric overhead hoist according to the second embodiment of the invention.

FIG. 5 illustrates the electrical system of a polyphase hoise according to the instant invention. The brake and controls are identical to that shown in FIG. 3 and operate in the same manner. The motor control is likewise identical except for three phase power supply, motor 26 shown, and the elimination of the capacitor and centrifugal switch for starting.

The electrical circuit of FIG. 5 is identical to that of FIG. 4 except for the connection of a capacitor 27 across one of the motor phases and the omission of the plugging feature of the upper limit switch. The capacitor 27 as in the case of the single phase motor may be selected based on the impedance characteristics of the motor to yield a resonant circuit condition with similar results.

Operation of the hoist is the same as that described in the preceding for single phase except as follows:

In the prior art, the polyphase motor when plugged with the loss of one phase, does not reverse, but continues to develop torque in the same (lifting direction) which would drive the hook into the winding means with sufficient power to damage the hoist and possible drop the load.

The instant invention by eliminating the plugging feature of the limit switch also eliminates the potentially hazardous situation caused by loss of one phase of the power supply during hoisting.

Should one phase of the power supply fail depending on which phase fails, either control power will be lost in which case the contactor will drop out de-energizing the motor and setting the brake or the motor will remain energized and continue to run in the proper direction with any load within the rated capacity of the hoist. Should one phase of the power supply fail with the hoist stationary, and an attempt be made to run it, it may or may not run depending on which phase failed. If the open phase happens to be the one which furnishes control power, the hoist will not run because the directional contactors will not close nor can the brake release. Should the open phase be other than the one furnishing control power, the appropriate directional contactor will close, the holding brake release, and the motor will be energized to run as a single phase capacitor run motor. With the motor windings properly connected, it will run in the intended direction. However, since the motor's torque connected for single phase operation is greatly reduced, its ability to start a suspended load in the hoist direction is limited to a value of typically half rated load. With suspended loads in excess of that which can be raised the drive will either stall or slowly lower.

A conventional hoist without a load brake under a similar single phase situation would lower at full speed in response to the actuation of the raise control, creating a potentially hazardous situation.

The capability of the polyphase hoist of the instant invention to operate in a normal manner on single phase at reduced loads can be seen to be of potential value in certain emergency or other necessary situations.

The foregoing is also true of a hoist with a mechanical load brake because the single phase motor of prior art hoists develops no torque at standstill. Therefore, in the absence of motor torque, the load brake would prevent motion in the lowering direction and without motor torque hoisting could not take place. However, on hoists without the mechanical load brake and with brake coil and control excitation furnished from the same phase, absence of power on a second phase would result in release of the holding brake and torque from the suspended load would cause the motor to start and run downward in response to actuation of the raise control switch, creating a potentially hazardous situation.

While two embodiments of the invention have been illustrated and described in detail, it should be understood that the invention is not limited thereto except as limited by the scope of the claims.

I claim:
1. A braking apparatus for electric motors subject to overhauling loads comprising:
   an alternating current power source;
   an electric alternating current motor having a normal operating speed;
   a control system for starting, stopping, and controlling the direction and limit of travel of said motor; and
   a fixed capacitor permanently connected to at least one of the motor windings such that at any time power is removed from said motor, said capacitor being selected in cooperation with the residual magnetic field of the motor stator windings and their associated impedance characteristics to effect a resonant condition causing said motor to become self-excited and to develop braking torque upon continued rotation of said motor above a speed substantially below normal operating speed for the purpose of limiting said speed with power off and said capacitor and said motor windings alone cooperate to effect running performance of said motor.
2. The apparatus of claim 1 wherein:
   said electric motor is of the single phase induction motor type and wherein said capacitor further effects the starting torque of said motor.
3. The apparatus of claim 2 wherein:

the capacitor effects a starting torque in the range of 125 to 175 percent of normal running torque.

4. The apparatus of claim 1 wherein:

the dynamic braking effect of said capacitor is sufficient to allow the elimination of plugging limit switches in the hoist limit control without increase in hoist headroom.

5. The apparatus of claim 1 wherein:

said electric motor is of the single phase alternating current induction type of the permanent split capacitor design; and said capacitor is designed to effect a starting torque of between 125 to 175 percent of normal running torque and sufficient braking to eliminate the necessity to plug the motor at limit stops and the need for supplimentary braking beyond the normal motor brake.

6. The apparatus of claim 1 wherein:

said electric motor comprises a polyphase induction motor type.

7. The apparatus of claim 6 further comprising a means to resist rotation of the motor opposite to the intended direction in case of loss of power on one phase of the polyphase supply and whereby the apparatus can be utilized when necessary from a single phase supply.

8. The apparatus of claim 6 wherein:

said capacitor is permanently connected across a single phase of the windings of said polyphase motor.

9. The apparatus of claim 6 wherein:

the electric drive motor is designed with reduced starting torque of 125 – 175 percent of normal rated running torque for the specific purpose of preventing dangerous overloading.

* * * * *